(12) United States Patent
Matsuo et al.

(10) Patent No.: US 10,006,348 B2
(45) Date of Patent: Jun. 26, 2018

(54) TURBOCHARGER DEVICE

(71) Applicant: MITSUBISHI HEAVY INDUSTRIES, LTD., Tokyo (JP)

(72) Inventors: Atsushi Matsuo, Tokyo (JP); Takao Yokoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/025,466

(22) PCT Filed: Nov. 27, 2014

(86) PCT No.: PCT/JP2014/081384
§ 371 (c)(1),
(2) Date: Mar. 28, 2016

(87) PCT Pub. No.: WO2015/083612
PCT Pub. Date: Jun. 11, 2015

(65) Prior Publication Data
US 2016/0312688 A1 Oct. 27, 2016

(30) Foreign Application Priority Data
Dec. 4, 2013 (JP) ................. 2013-251251

(51) Int. Cl.
*F02D 23/00* (2006.01)
*F02B 37/18* (2006.01)
(Continued)

(52) U.S. Cl.
CPC ............ *F02B 37/18* (2013.01); *F02B 37/24* (2013.01); *F02B 39/16* (2013.01);
(Continued)

(58) Field of Classification Search
CPC ........ F02B 37/18; F02B 37/24; F02B 37/013; F02B 39/16; F02B 2037/125;
(Continued)

(56) References Cited

U.S. PATENT DOCUMENTS 4,756,377 A 7/1988 Kawamura et al.
4,774,811 A 10/1988 Kawamura
(Continued)

FOREIGN PATENT DOCUMENTS

CN 1360714 A 7/2002
CN 101105429 A 1/2008
(Continued)

OTHER PUBLICATIONS

Extended European Search Report dated Jan. 10, 2017 issued in the corresponding EP Application No. 14867944.2.
(Continued)

*Primary Examiner* — Thai Ba Trieu
(74) *Attorney, Agent, or Firm* — Birch, Stewart, Kolasch & Birch, LLP (57) ABSTRACT

A turbocharger device includes: a turbocharger (3); and a turbo controller (35) configured to control a waste-gate valve (31) or a variable-displacement mechanism of an exhaust-gas amount supplied to the turbine to control a boost pressure of the turbocharger, the turbo controller (35) including a control calculation part (44) and a sensor signal input part (45) provided separately and independently from an engine controller (33) and being mounted to a compressor housing at a side of the compressor (23b) of the turbocharger (3).

7 Claims, 9 Drawing Sheets

(51) Int. Cl.
  *F02B 37/24* (2006.01)
  *F02D 41/14* (2006.01)
  *F02D 41/22* (2006.01)
  *F02D 41/00* (2006.01)
  *F02B 37/12* (2006.01)
  *F02B 39/16* (2006.01)

(52) U.S. Cl.
  CPC ..... *F02D 41/0007* (2013.01); *F02D 41/1446* (2013.01); *F02D 41/22* (2013.01); *F02B 2037/125* (2013.01); *F02B 2039/166* (2013.01); *F02B 2039/168* (2013.01); *Y02T 10/144* (2013.01); *Y02T 10/16* (2013.01); *Y02T 10/40* (2013.01)

(58) Field of Classification Search
  CPC .......... F02B 2039/166; F02B 2039/168; F02D 41/0007; F02D 41/1446; F02D 41/22; Y02T 10/144; Y02T 10/16; Y02T 10/40
  USPC ........ 60/605.1, 600–603, 612; 701/102–104; 123/562
  See application file for complete search history.

(56) References Cited

U.S. PATENT DOCUMENTS

| | | | |
|---|---|---|---|
| 4,884,407 | A | 12/1989 | Hatanaka |
| 5,645,033 | A | 7/1997 | Person et al. |
| 6,089,018 | A | 7/2000 | Bischoff et al. |
| 6,209,390 | B1 | 4/2001 | LaRue et al. |
| 8,051,661 | B2 | 11/2011 | Igarashi et al. |
| 8,584,460 | B2 | 11/2013 | Mårdberg Jozsa et al. |
| 8,813,494 | B2 | 8/2014 | Hofer et al. |
| 2003/0145591 | A1 | 8/2003 | Arnold |
| 2004/0139809 | A1 | 7/2004 | Soechting et al. |
| 2004/0187495 | A1 | 9/2004 | Ando et al. |
| 2005/0193810 | A1 | 9/2005 | Gladden |
| 2006/0021344 | A1 | 2/2006 | Barba et al. |
| 2006/0026960 | A1 | 2/2006 | Butscher et al. |
| 2006/0113799 | A1 | 6/2006 | Obayashi et al. |
| 2006/0287795 | A1 | 12/2006 | Samad et al. |
| 2008/0035112 | A1* | 2/2008 | Yamaguchi ............. F02B 37/24 123/436 |
| 2008/0047268 | A1 | 2/2008 | Isogai et al. |
| 2008/0104957 | A1* | 5/2008 | Birkner .................. F02B 37/18 60/602 |
| 2009/0107140 | A1 | 4/2009 | Pursifull |
| 2009/0222190 | A1 | 9/2009 | Andreae et al. |
| 2009/0287448 | A1 | 11/2009 | Brown et al. |
| 2009/0299609 | A1 | 12/2009 | Gokhale |
| 2011/0192161 | A1 | 8/2011 | Takahaski et al. |
| 2011/0288744 | A1 | 11/2011 | Gokhale et al. |
| 2013/0167810 | A1 | 7/2013 | Roplekar et al. |
| 2013/0227944 | A1 | 9/2013 | Denholm et al. |
| 2015/0037178 | A1 | 2/2015 | Wang |
| 2015/0122234 | A1 | 5/2015 | Tanaka |
| 2015/0285122 | A1 | 10/2015 | Yamashita et al. |
| 2017/0002726 | A1 | 1/2017 | Iwamoto |

FOREIGN PATENT DOCUMENTS

| | | |
|---|---|---|
| CN | 101424211 A | 5/2009 |
| CN | 101273385 B | 5/2010 |
| CN | 102177323 A | 9/2011 |
| CN | 102331343 A * | 1/2012 |
| CN | 102418610 A | 4/2012 |
| EP | 2 317 082 A2 | 11/2000 |
| EP | 2434123 A1 | 3/2012 |
| JP | 58-53643 A | 3/1983 |
| JP | 59-52139 U | 4/1984 |
| JP | 61-38127 U | 3/1986 |
| JP | 62-210222 A | 9/1987 |
| JP | 64-32019 A | 2/1989 |
| JP | 5-33668 A | 2/1993 |
| JP | 5-280365 A | 10/1993 |
| JP | 6-323158 A | 11/1994 |
| JP | 6-341325 A | 12/1994 |
| JP | 7-150990 A | 6/1995 |
| JP | 8-326555 A | 12/1996 |
| JP | 9-329032 A | 12/1997 |
| JP | 10-159576 A | 6/1998 |
| JP | 2000-179348 A | 6/2000 |
| JP | 2000-356158 A | 12/2000 |
| JP | 2001-342840 A | 12/2001 |
| JP | 2002-188474 A | 7/2002 |
| JP | 2002-544443 A | 12/2002 |
| JP | 2003-227362 A | 8/2003 |
| JP | 2003-269183 A | 9/2003 |
| JP | 2004-27897 A | 1/2004 |
| JP | 2004-251203 A | 9/2004 |
| JP | 2005-83317 A | 3/2005 |
| JP | 2005-155384 A | 6/2005 |
| JP | 2005-248952 A | 9/2005 |
| JP | 2005-351129 A | 12/2005 |
| JP | 2006-63873 A | 3/2006 |
| JP | 2006-188989 A | 7/2006 |
| JP | 2006-207506 A | 8/2006 |
| JP | 2006-242462 A | 9/2006 |
| JP | 2006-242487 A | 9/2006 |
| JP | 2007-32860 A | 2/2007 |
| JP | 2007-206007 A | 8/2007 |
| JP | 2008-45410 A | 2/2008 |
| JP | 2008-175126 A | 7/2008 |
| JP | 2008-544144 A | 12/2008 |
| JP | 4209350 B2 | 1/2009 |
| JP | 2010-14122 A | 1/2010 |
| JP | 4415912 B2 | 2/2010 |
| JP | 2010-180710 A | 8/2010 |
| JP | 2010-190145 A | 9/2010 |
| JP | 2011-247181 A | 12/2011 |
| JP | 2011-266743 A | 12/2011 |
| JP | 2012-7544 A | 1/2012 |
| JP | 2012-52508 A | 3/2012 |
| JP | 2013-19319 A | 1/2013 |
| JP | 2013-127221 A | 6/2013 |
| JP | 2013-133776 A | 7/2013 |
| JP | 2013-185441 A | 9/2013 |
| JP | 2013-217382 A | 10/2013 |
| JP | 2014-84772 A | 5/2014 |
| JP | 2014084772 A * | 5/2014 |
| WO | WO 00/70562 A1 | 11/2000 |
| WO | WO 03/071111 A1 | 8/2003 |
| WO | WO 2006/138545 A1 | 12/2006 |
| WO | WO 2007/065094 A1 | 5/2007 |
| WO | WO 2007/141613 A1 | 12/2007 |
| WO | WO 2013/004595 A1 | 1/2013 |
| WO | WO 2013/066529 A1 | 5/2013 |
| WO | WO 2013/157126 A1 | 10/2013 |

OTHER PUBLICATIONS

Partial Supplementary European Search Report, dated Feb. 28, 2017, for European Application No. 14868535.7.
Partial Supplementary European Search Report, dated Mar. 2, 2017, for European Application No. 14867002.9.
International Search Report and Written Opinion of the International Searching Authority (Forms PCT/ISA/210, PCT/ISA/220 and PCT/ISA/237), dated Feb. 3, 2015, for International Application No. PCT/JP2014/079634.
International Search Report and Written Opinion of the International Searching Authority (Forms PCT/ISA/210, PCT/ISA/220 and PCT/ISA/237), dated Jan. 27, 2015, for International Application No. PCT/JP2014/081384.
International Search Report and Written Opinion of the International Searching Authority (Forms PCT/ISA/210, PCT/ISA/220 and PCT/ISA/237), dated Mar. 3, 2015, for International Application No. PCT/JP2014/081381.
International Search Report and Written Opinion of the International Searching Authority (Forms PCT/ISA/210, PCT/ISA/220 and PCT/ISA/237), dated Mar. 3, 2015, for International Application No. PCT/JP2014/081387.

(56) References Cited

OTHER PUBLICATIONS

International Search Report and Written Opinion of the International Searching Authority (Forms PCT/ISA/210, PCT/ISA/220 and PCT/ISA/237), dated Mar. 3, 2015, for International Application No. PCT/JP2014/081723.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/079634, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081381, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081384, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081387, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081723, together with an English translation thereof.
Extended European Search Report, dated Jul. 1, 2016, for European Application No. 14868701.5.
Extended European Search Report dated Nov. 4, 2016 in corresponding EP Application No. 14868295.8.
Office Action dated May 31, 2017, issued to the corresponding Chinese Application No. 201480051228.1 with an English Translation.
Extended European Search Report dated Jun. 8, 2017 issued to the corresponding EP Application No. 14867002.9.
Extended European Search Report dated Jun. 8, 2017 issued to the corresponding EP Application No. 14868535.7.
Chinese Office Action and Search Report, dated Aug. 3, 2017, for Chinese Application No. 201480051852.1, with an English translation of the Office Action.
Chinese Office Action and Search Report, dated Aug. 7, 2017, for Chinese Application No. 201480050503.8, with an English translation of the Office Action.
Chinese Office Action and Search Report for Chinese Application No. 201480060612.8, dated Sep. 5, 2017, with an English translation of the Office Action.
Japanese Notification of Reasons for Refusal for Japanese Application No. 2013-251248, dated Sep. 1, 2017, with an English translation.
U.S. Office Action for U.S. Appl. No. 15/024,642, dated Sep. 15, 2017.
Chinese Office Action and Search Report for Chinese Application No. 201480065709.8, dated Nov. 3, 2017, with English translation of the Office Action.

\* cited by examiner

TURBOCHARGER DEVICE

TECHNICAL FIELD

The present invention relates to a turbocharger device for an engine, especially to an arrangement of a control device for controlling a turbocharger and lifetime estimation of the turbocharger performed by the control device.

BACKGROUND ART

In an engine used for an automobile or the like, an exhaust turbocharger is widely used, in which a turbine is rotated by exhaust gas energy of the engine and a centrifugal compressor directly coupled to the turbine via a rotation shaft compresses intake air and supplies the engine with the intake air, to improve the output of the engine.

Such an exhaust turbocharger is required to have a lifetime of hundreds of thousands kilometers for automobiles, equivalent to that of the automobiles, or a lifetime of more than a million kilometers for trucks and buses.

However, an operation history (e.g. operation time, rotation speed, and cumulative damage level) of a turbocharger is not sufficiently understood. Further, a turbocharger is required to have a high reliability, and thus to be designed with sufficient safety, which results in having a high spec in terms of material strength (high strength, high durability) and a high cost.

Meanwhile, with regard to the lifetime estimation of turbochargers, Patent Document 1 (JP2002-544443A, translation of a PCT application) discloses an invention related to a fatigue-lifetime monitoring device for a turbocharger.

The document discloses a sensor for measuring a rotation speed of a rotation shaft of a turbocharger, a unit to calculate an actual malfunctioning probability of a turbocharger by processing rotation-speed information from the sensor to compare the actual malfunctioning probability of the turbocharger with a preset malfunctioning probability of the turbocharger, and displaying excess to prompt maintenance if the actual probability is greater than the preset malfunctioning probability of the turbocharger as a result of the comparison.

Further, the document also discloses inputting an inlet temperature of a turbocharger turbine as information, and a central processing unit and a storage unit provided in a package independently from, or as a part of, an engine control module.

CITATION LIST

Patent Literature

Patent Document 1: JP2002-544443A (translation of a PCT application)

SUMMARY

Problems to be Solved

As described above, a turbocharger is required to have a high reliability, and thus to be designed to achieve a sufficient safety rate, which results in a high spec in terms of material strength and tends to increase the cost. If the lifetime estimation of a turbocharger is performed accurately, it is possible to set a lifetime shorter than in a conventional case, and to manufacture turbochargers with reduced costs, thereby reducing initial costs. Thus, a method of accurately determining a lifetime is required.

Further, if it is possible to recover a control unit having recorded operational history information of a turbocharger when the turbocharger with an expired lifetime is to be replaced, it is advantageous in terms of acquisition of the operational history information and determination of the cause of malfunction or the like. Thus, it is desirable to provide a recorder for recording an operational history of a turbocharger independently and separately from an engine ECU (engine control unit) for controlling an engine, the recorder being recoverable together when the turbocharger is to be replaced.

Whereas Patent Document 1 discloses performing lifetime estimation of a turbocharger, there is no disclosure of a specific estimation unit. Further, with regard to replacement of a turbocharger, Patent Document 1 does not disclose an arrangement structure of a control unit that is recoverable at the same time as a turbocharger.

The present invention was made in view of the above conventional technical problems, and an object of the present invention is to provide a turbocharger device which predicts a lifetime of a turbocharger accurately, whereby, if the lifetime expires, the turbocharger can be replaced along with a turbo controller (turbo ECU) having recorded data of the operational history of the turbocharger, which makes it possible to facilitate acquisition of the operational history information of the turbocharger and reduce the initial costs of the turbocharger.

Solution to the Problems

The present invention was made to achieve the above object, and a turbocharger device comprises: a turbocharger including a turbine rotated by exhaust gas from an engine and a compressor driven to rotate by the turbine to supercharge intake air to the engine; and a turbo controller configured to control a waste-gate valve or a variable-displacement mechanism of an exhaust-gas amount supplied to the turbine to control a boost pressure of the turbocharger, the turbo controller including a control calculation part and a sensor signal input part provided separately and independently from an engine controller for controlling operation of the engine and being mounted to a compressor housing at a side of the compressor of the turbocharger.

According to the above invention, the turbo controller includes a control calculation part and a sensor signal input part provided separately and independently from an engine controller, and mounted to a compressor housing at a side of the compressor of the turbocharger. With this arrangement, the control calculation part and the sensor signal input part are less likely to be affected by heat of exhaust gas.

Further, when the turbocharger is to be replaced, it is possible to recover the turbo controller easily at the same time. Further, data input and calculation, which are required for control, are performed not via an engine controller, which makes it possible to improve responsiveness and accuracy of the control.

Further, a turbocharger with an expired lifetime can be easily replaced along with a turbo controller. Thus, an initial cost can be reduced as compared to a high-spec turbocharger which is not designed to be replaceable.

Further, preferably in the present invention, the turbo controller comprises an operational history recording part configured to record operational history information of the turbocharger, and a lifetime estimation unit configured to estimate a lifetime of the turbocharger on the basis of the operational history information including at least one of a rotation speed of a rotation shaft of the turbocharger, a boost pressure of the compressor, or a temperature of exhaust gas flowing into the turbine, inputted from the sensor signal input part and recorded by the operational history recording part.

As described above, the lifetime estimation unit estimates a lifetime on the basis of the operational information including a rotation speed of a rotation shaft of the turbocharger, a boost pressure of the compressor, a temperature of exhaust gas inputted into the turbine, or also time, which are inputted from the sensor signal input part and recorded by the operational history recording part.

The operational history information related to the turbocharger is directly inputted from the sensor signal input part of the turbo controller not via the engine controller. Thus, there is no risk of failing to achieve accurate data depending on a transmission cycle, unlike data transmission via the engine controller, and thus it is possible to perform accurate determination using the operational history information required for lifetime determination.

Further, the turbo controller includes the operational history recording part for recording the operational history information of the turbocharger. In this way, it is possible to easily acquire the operational history information, and analyze the operational information to easily determine the cause of malfunction or the like and reflect the determination result in future development.

Further, preferably in the present invention, the lifetime estimation unit comprises a cumulative-time calculation part configured to calculate a cumulative time of each rotation speed on the basis of an average rotation speed or a maximum rotation speed of the rotation shaft of the turbocharger in a periodic interval, and a lifetime determination part configured to determine the lifetime by comparing the cumulative time with a preset reference cumulative time.

In the lifetime determination performed by the lifetime prediction unit, with a cumulative time at which the lifetime expires having been calculated for each rotation speed in advance as a reference cumulative time by a test or simulation calculation, it is determined whether the lifetime has expired by comparing the reference cumulative time with an actual cumulative time corresponding to each rotation speed calculated by the cumulative time calculation part. It is possible to determine the lifetime readily by comparing the cumulative time with the preset reference cumulative time.

Further, preferably in the present invention, the lifetime estimation unit comprises: a surge-margin calculation part configured to calculate a surge margin on the basis of the boost pressure of the compressor, the surge margin representing a margin of the boost pressure with respect to occurrence of surging of the compressor; and a lifetime determination part configured to determine the lifetime by comparing the surge margin with a preset reference surge margin.

A turbocharger deteriorates in performance with the operating time, and an operation range gets closer to a surge pressure at which surging occurs determined on the basis of the performance characteristics of a compressor. Thus, it is possible to determine the lifetime by comparing a surge margin, used as an index, with a reference surge margin set in advance, the surge margin being a margin of a boost pressure with respect to a surge pressure.

Further, preferably in the present invention, the lifetime estimation unit comprises: a rotation-speed margin calculation part configured to calculate a rotation-speed margin on the basis of the rotation speed of the rotation shaft of the turbocharger, the rotation-speed margin representing a margin with respect to a tolerance rotation speed at which over rotation occurs; and a lifetime determination part configured to determine the lifetime by comparing the rotation-speed margin with a preset reference rotation-speed margin.

Similarly to the above surge margin, the turbocharger deteriorates in performance with the operating time, and in particular, the characteristic performance of the waste-gate valve and the variable nozzle mechanism, in the case of a variable-displacement type turbocharger, may decrease, thus resulting in insufficient control on the amount of exhaust gas flowing into the turbine and over rotation. Thus, it is possible to determine the lifetime by comparing a rotation-speed margin, used as an index, with a reference rotation-speed margin set in advance, the rotation-speed margin being a margin of a an actual rotation speed with respect to a tolerance over rotation.

Further, preferably in the present invention, the lifetime estimation unit comprises: an exhaust-temperature margin calculation part configured to calculate an exhaust-temperature margin on the basis of the temperature of the exhaust gas flowing into the turbine, the exhaust-temperature margin representing a margin with respect to a tolerance exhaust temperature at which over heating occurs; and a lifetime determination part configured to determine the lifetime by comparing the exhaust-temperature margin with a preset lifetime exhaust-temperature margin.

As described in relation to the above over-rotation margin, deterioration due to aging reduces operation performance of the waste-gate valve and the variable nozzle mechanism (in the case of a variable-displacement type turbocharger), which increases the risk of over rotation and brings about an increase in an exhaust-gas temperature in accordance with over rotation. Thus, it is possible to determine the lifetime by comparing an exhaust-temperature margin, used as an index, with a reference exhaust-temperature margin set in advance, the exhaust-temperature margin being a margin with respect to an tolerance exhaust-gas temperature.

Further, preferably in the present invention, the lifetime estimation unit comprises a lifetime determination part configured to determine the lifetime on the basis of a rotation speed which has a rotation-speed extreme value in a rotation-speed fluctuation of the turbocharger and an occurrence number of the rotation-speed extreme value.

As described above, a lifetime is estimated on the basis of a rotation speed which has rotation-speed extreme values in the rotation fluctuation and the occurrence number of the rotation extreme values. That is, a lifetime is determined taking into account a stress amplitude due to the rotation fluctuation. As a result, it is possible to determine the lifetime accurately on the basis of the fatigue strength of the blades of an impeller of the compressor or the turbine of the turbocharger.

Further, preferably in the present invention, the lifetime estimation unit comprises a rotation-speed extreme-value determination part configured to determine the rotation-speed extreme value, a stress calculation part configured to calculate a stress amplitude from the rotation speed of the rotation-speed extreme value, a repetition-number calculation part configured to calculate a repetition number on the basis of an S-N chart of fatigue strength of blades of an impeller of the compressor or the turbine from the stress amplitude, a damage-factor calculation part configured to calculate a damage factor from the rotation speed of the rotation-speed extreme value, and a damage-factor accumulation part configured to accumulate the damage factor as many time as the repetition number to calculate a damage-factor cumulative value. Further, the lifetime determination part is configured to determine the lifetime by comparing the damage-factor cumulative value calculated by the damage-factor accumulation part with a preset damage-factor reference cumulative value.

As described above, the lifetime determination unit specifically includes the rotation-speed extreme value determination part, the stress-calculation part, the repetition-number calculation part, the damage-factor calculation part, the damage-factor accumulation part, and the lifetime determination part to estimate a lifetime on the basis of a rotation speed which has rotation-speed extreme values in the rotation fluctuation and the occurrence number of the rotation extreme values. As a result, it is possible to determine the lifetime accurately on the basis of the fatigue strength of the blades of the impeller of the compressor or the turbine of the turbocharger.

Advantageous Effects

According to the present invention, it is possible to predict a lifetime of a turbocharger accurately, and if the lifetime expires, the turbocharger can be replaced along with a turbo controller (turbo ECU) having recorded data of the operational history of the turbocharger, which makes it possible to facilitate acquisition of the operational history information of the turbocharger and reduce the initial costs of the turbocharger.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
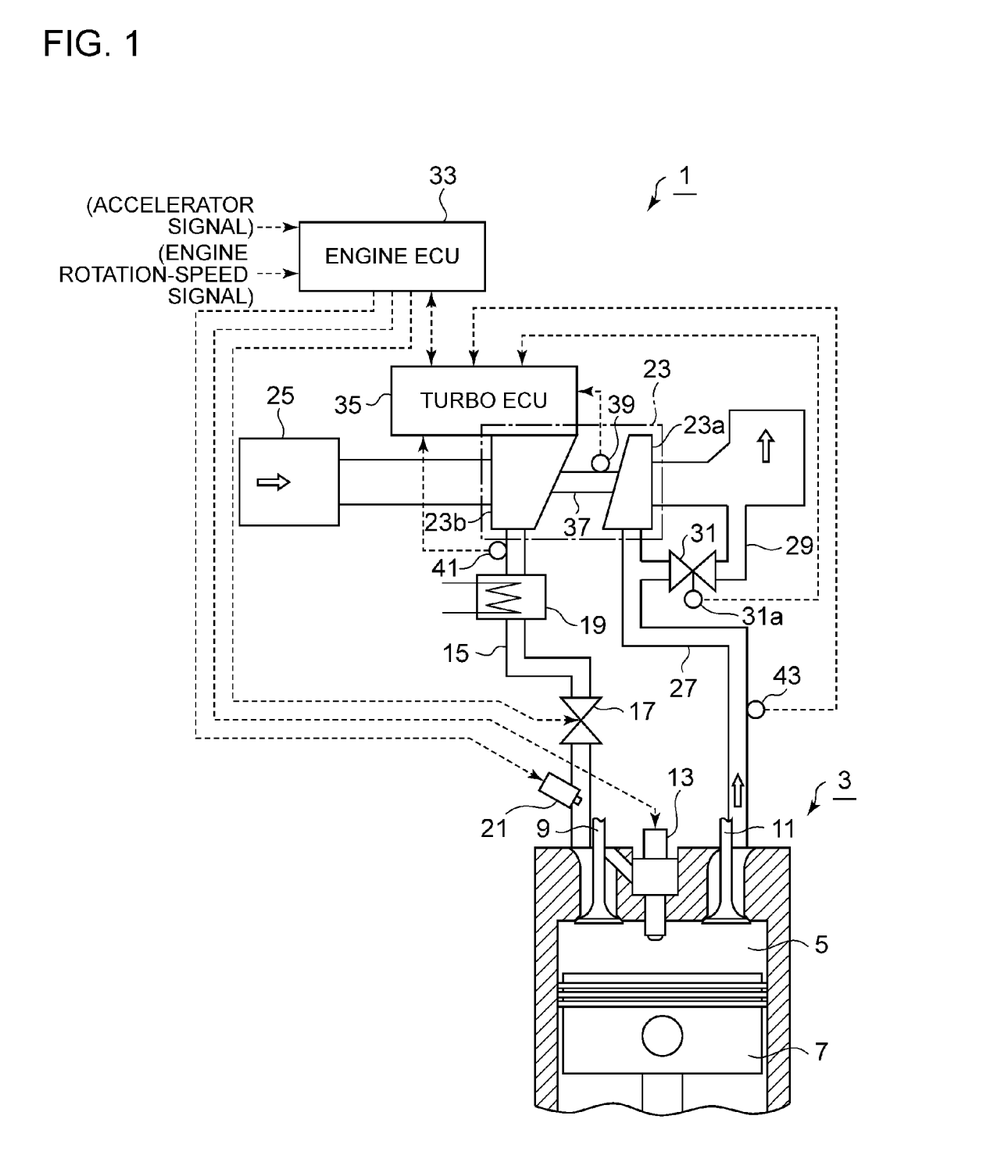
FIG. 1 is an overall configuration diagram illustrating the first embodiment of a turbocharger device according to the present invention.

FIG. 1 illustrates an overall configuration of a turbocharger device 1 according to the first embodiment of the present invention. The engine 3 is a diesel engine or a gasoline engine to be mounted to a vehicle, a truck, a bus, a ship, an industrial engine, or the like. A gasoline engine is illustrated in the present example, the gasoline engine including a combustion chamber 5, a piston 7, an intake valve 9, an exhaust valve 11, and an ignition plug 13. A throttle valve 17 and an inter cooler 19 are disposed in an intake channel 15, and a fuel injection nozzle 21 is disposed on an intake port at a downstream side of the throttle valve 17 with respect to a flow of intake air.

Further, the engine 3 includes an exhaust turbocharger (turbocharger) 23, the turbocharger 23 including a turbine 23a rotated by exhaust gas from the engine 3 and a compressor 23b driven to rotate by the turbine 23a to supercharge intake air to the engine 3. Air flows into the compressor 23b via an air cleaner 25.

An exhaust channel 27 connecting the engine 3 and the turbine 23a of the turbocharger 23 branches midway to form a branch channel 29. A waste-gate valve 31 is disposed in the branch channel 29, and the branch channel 29 bypasses the turbine 23a to be in communication with a downstream exhaust channel.

Figure 2:
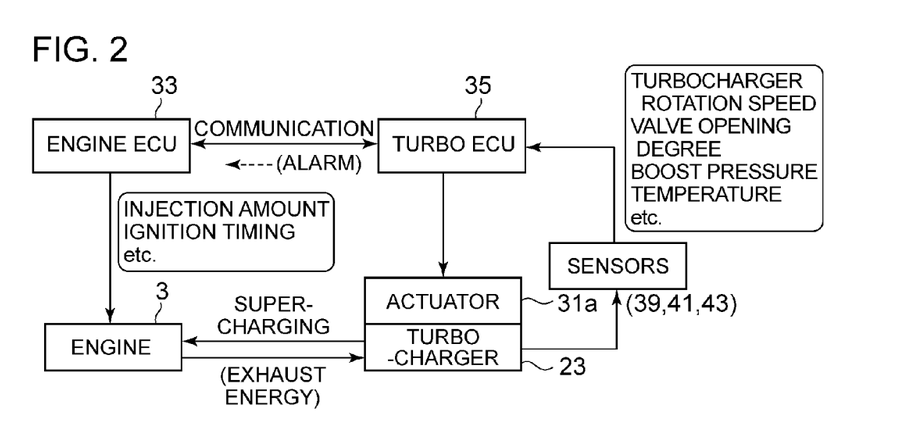
FIG. 2 is an explanatory diagram of signal transmission between an engine ECU and a turbo ECU according to the first embodiment.

As illustrated in FIGS. 1 and 2, the engine 3 includes an engine controller (engine ECU) 33 which controls an injection timing of the fuel injection nozzle 21 and an ignition time of the ignition plug 13, for instance, on the basis of engine control signals including an engine rotation speed and an engine load (accelerator signal).

Further, the turbocharger 23 is configured such that the boost pressure of the turbocharger 23 is controlled by controlling the operation of an actuator 31a for opening and closing the waste-gate valve 31 in response to signals from a turbo controller (turbo ECU) 35.

As illustrated in FIGS. 1 and 2, signals from the various sensors are inputted to the turbo ECU 35. For instance, the inputted signals include: a rotation speed signal from a turbo rotation speed sensor 39 for detecting a rotation speed of a rotation shaft 37 of the turbocharger 23; an opening-degree signal of the waste-gate valve 31; a signal from a pressure sensor 41 for detecting a boost pressure achieved by the compressor 23b; and a signal from a temperature sensor 43 for detecting an exhaust-gas temperature introduced into the turbine 23a.

Figure 3:
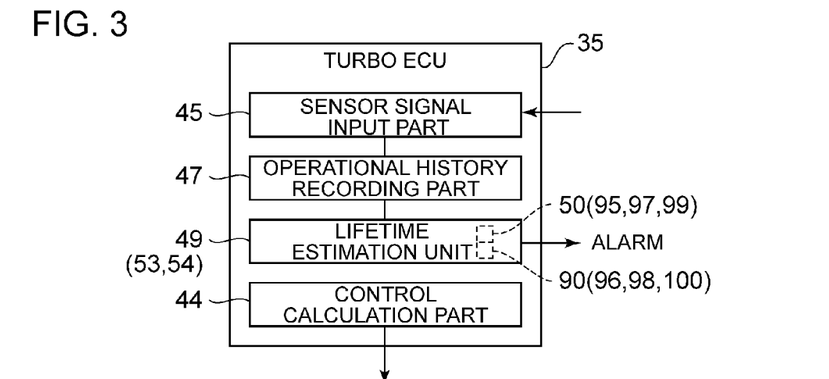
FIG. 3 is a configuration block diagram of the turbo ECU in FIG. 2.

Further, as illustrated in FIG. 3, the turbo ECU 35 includes a control calculation part 44 and a sensor signal input part 45 provided separately and independently from the engine ECU 33, as well as an operational history recording part 47 which records operational-history information of the turbocharger 23, and a lifetime estimation unit 49 which determines whether the lifetime of the turbocharger 23 has expired. Further, the unitized turbo ECU 35 is mounted to a compressor housing at the side of the compressor 23b of the turbocharger 23, as illustrated in FIG. 1.

As described above, the turbo ECU 35 includes the control calculation part 44 and the sensor signal input part 45 provided separately and independently from the engine ECU 33, as well as the operational history recording part 47 which records operational-history information of the turbocharger 23, and is mounted to the compressor housing at the side of the compressor 23b of the turbocharger 23. Thus, the control calculation part 44 and the sensor signal input part 45 are less likely to be affected by heat of exhaust gas, and there is less influence from heat.

Further, when the turbocharger 23 is to be replaced, it is possible to recover the turbo ECU 35 easily at the same time. Accordingly, it is possible to facilitate acquisition of the operational history information, and analyze the operational information to easily determine the cause of malfunction or the like and reflect the determination result in future development.

FIG. 2 illustrates the signal transmission between the engine ECU 33 and the turbo ECU 35. As illustrated in FIG. 2, sensor signals such as the engine rotation speed, the accelerator position, and the like are inputted into the engine ECU 33, and operation control for the engine, such as a target-boost-pressure control, an air-fuel ratio control, a fuel-injection-amount control, and an ignition-timing control, is performed on the basis of the above signals.

Further, information on the state amount, such as the engine rotation speed and the fuel injection amount, and a target-boost-pressure control signal are transmitted from the engine ECU 33 to the turbo ECU 35 through a communication line at a predetermined communication cycle. From the turbo ECU 35, an alarm signal or the like of a result determining that the lifetime has expired is transmitted back to the engine ECU 33 as a result of the lifetime estimation described below.

The control calculation part 44 of the turbo ECU 35 controls an actuator of the turbocharger 23, for example, the actuator 31a for opening and closing the waste-gate valve 31, so as to achieve a target boost pressure on the basis of the target-boost-pressure control signal from the engine ECU 33 and various sensor signals from the turbocharger 23.

Figure 4:
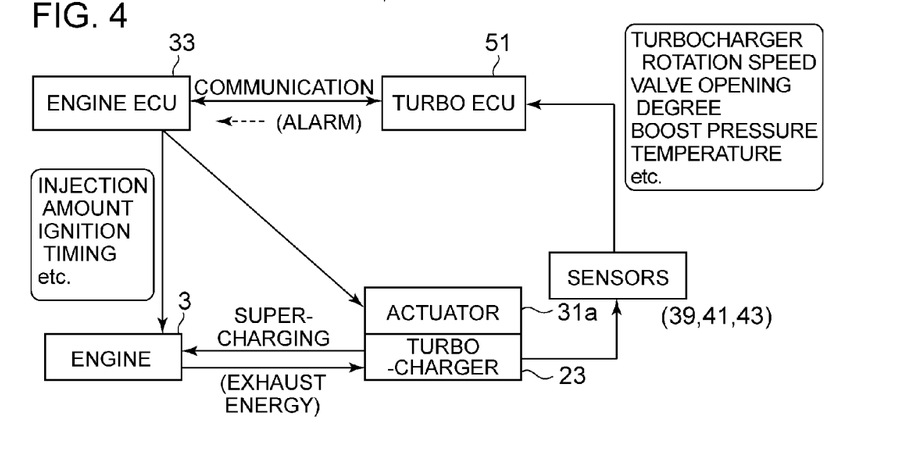
FIG. 4 is another explanatory diagram of the signal transmission in FIG. 2.

FIG. 4 illustrates a modified example of the turbo ECU 35 of FIGS. 2 and 3. The turbo ECU 51 of FIG. 4 may not include a component corresponding to the control calculation part 44 of the turbo ECU 35 of FIG. 2, and the control signals from the engine ECU 33 may be used to directly perform the opening-and-closing control on an actuator of the turbocharger 23, for example, the actuator for opening and closing the waste-gate valve 31, so as to achieve a target boost pressure.

Figure 5:
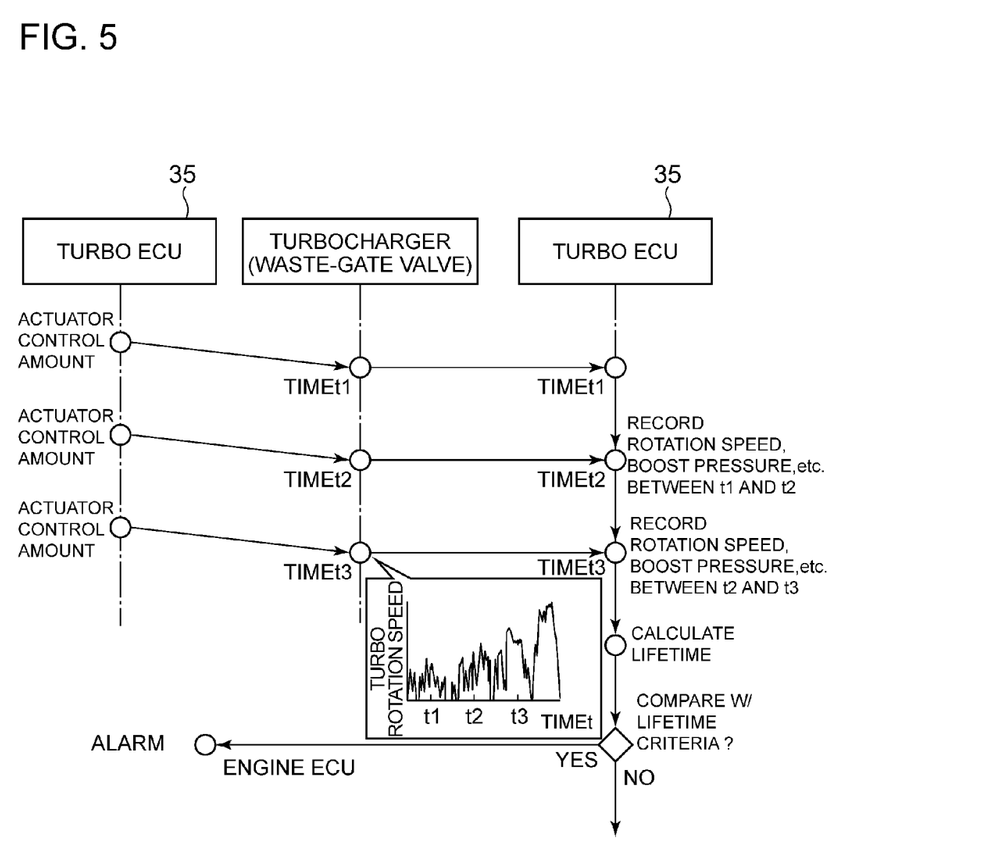
FIG. 5 is an explanatory time chart schematically showing a flow of acquisition of operational-history data and lifetime estimation of a turbo ECU.

Next, with reference to FIGS. 5 and 6, the lifetime estimation unit 49 of the turbo ECU 35 will now be described. FIG. 5 is a diagram based on the relationship of the signal transmission between the engine ECU 33 and the turbo ECU 35 illustrated in FIGS. 2 and 3.

Figure 6:
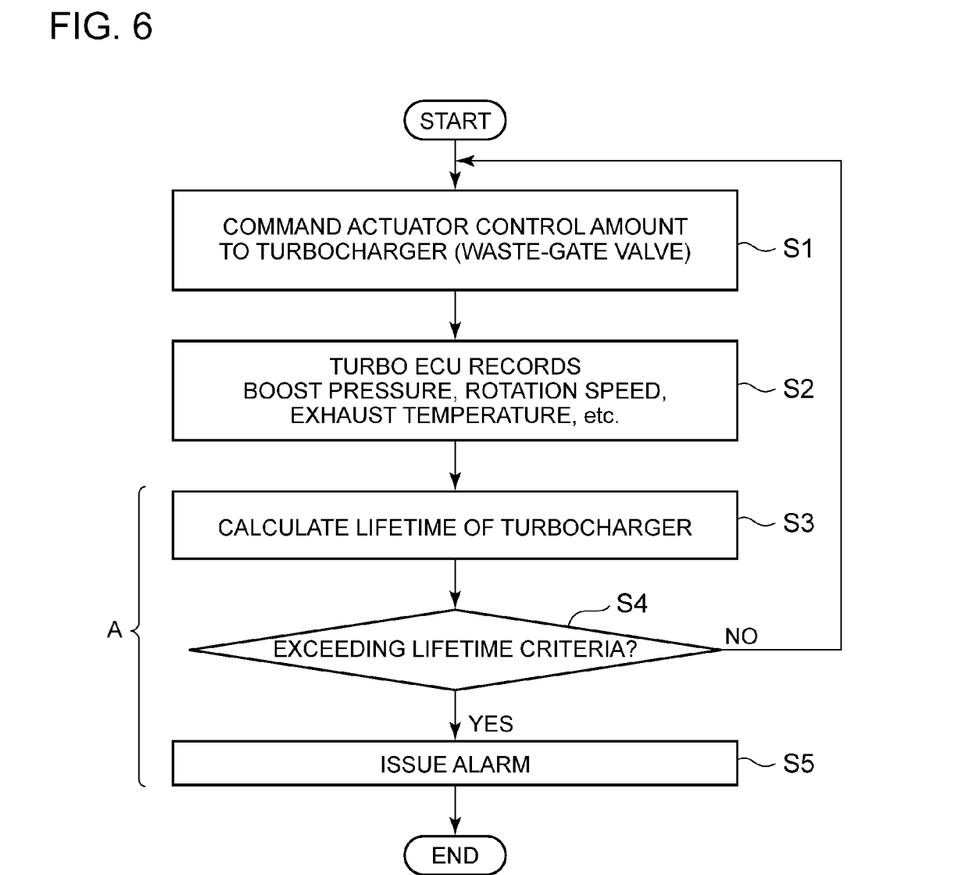
FIG. 6 is a flowchart of a process of lifetime estimation of a turbo ECU.

Firstly, in step S1 of FIG. 6, the turbo ECU 35 sends a control command value to the actuator of the waste-gate valve 31 at regular intervals, at times t1, t2, t3, and so on.

Then, in step S2, at the time of t2, the operational history recording part 47 records operational history data, such as the rotation speed, the exhaust temperature, and the boost pressure, between t1 and t2. Similarly, data between t2 and t3 is recorded at t3, and data between t3 and t4 is recorded at t4.

Then, in step S3, lifetime is calculated on the basis of the operational history data recorded in each period between the regular intervals, and in step S4, the calculated lifetime is compared with a lifetime reference value. If the calculated lifetime is greater than the lifetime reference value, it is determined that the lifetime has expired, and in step S5, an alarm is outputted to the engine ECU 33.

Figure 7:
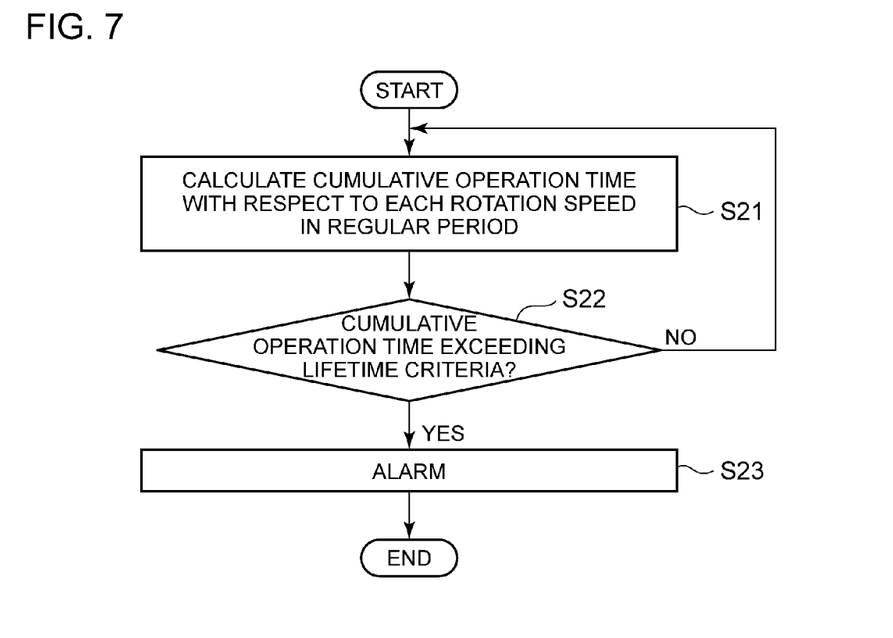
FIG. 7 is a detailed flowchart of section A of the flowchart in FIG. 6.
Figure 8:
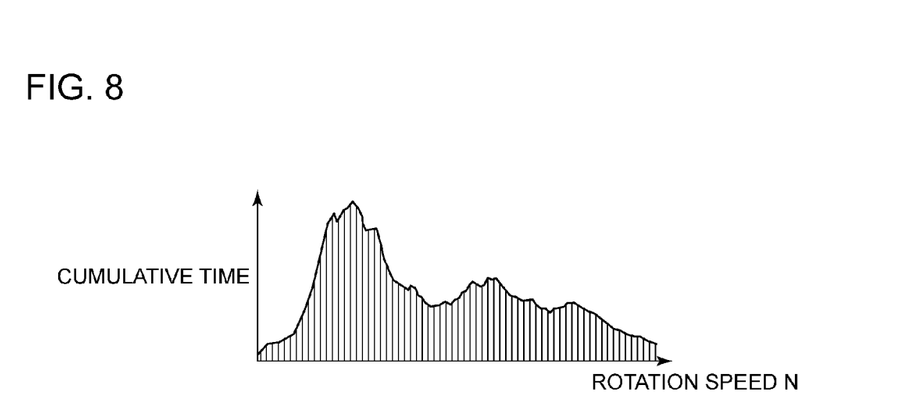
FIG. 8 is an explanatory diagram showing an image of the flowchart in FIG. 7.

The range A, from steps S3 to S5, of the flowchart in FIG. 6 is illustrated in more details in FIGS. 7 and 8. In step S21 of FIG. 7, a cumulative operation time is calculated, the cumulative operation time corresponding to the average rotation speed in each period between the regular intervals, or to the maximum rotation speed in the period. The period between the regular intervals is defined as having the same interval as an operation command output timing of the control amount to the actuator 31a of the waste-gate valve 31, and the rotation speed between the intervals is detected by signals from the turbo rotation speed sensor 39.

A cumulative-time calculation part 50 is provided, which calculates a cumulative time as a cumulative value of the time between the regular intervals of sampling. The cumulative time is as illustrated in FIG. 8, with x-axis representing the rotation speed (N) and y-axis representing the cumulative time with respect to an average rotation speed or the maximum rotation speed.

Next, in step S22, with a cumulative time at which the lifetime expires having been calculated for each rotation speed in advance as a reference cumulative time by a test or simulation calculation, it is determined whether the lifetime has expired by comparing the reference cumulative time with an actual cumulative time corresponding to each rotation speed calculated by the cumulative time calculation part. For instance, a stress amplitude may be calculated from each rotation speed and a damage factor derived using an S-N chart may be accumulated, thereby determining that the lifetime has expired if the damage factor exceeds 1. An alarm may be issued if a criteria, which is a product of the damage factor and a safety rate, is exceeded.

Then, in step S23, an alarm is outputted if it is determined that the lifetime has expired. As described above, it is possible to determine the lifetime readily by comparing the cumulative time with respect to the rotation speed with the preset reference cumulative time.

Further, by informing the expiration of the lifetime, replacement of the turbocharger is prompted. Thus, the cost can be reduced as compared to a high-spec turbocharger which is not designed to be replaceable.

Second Embodiment

Figure 9:
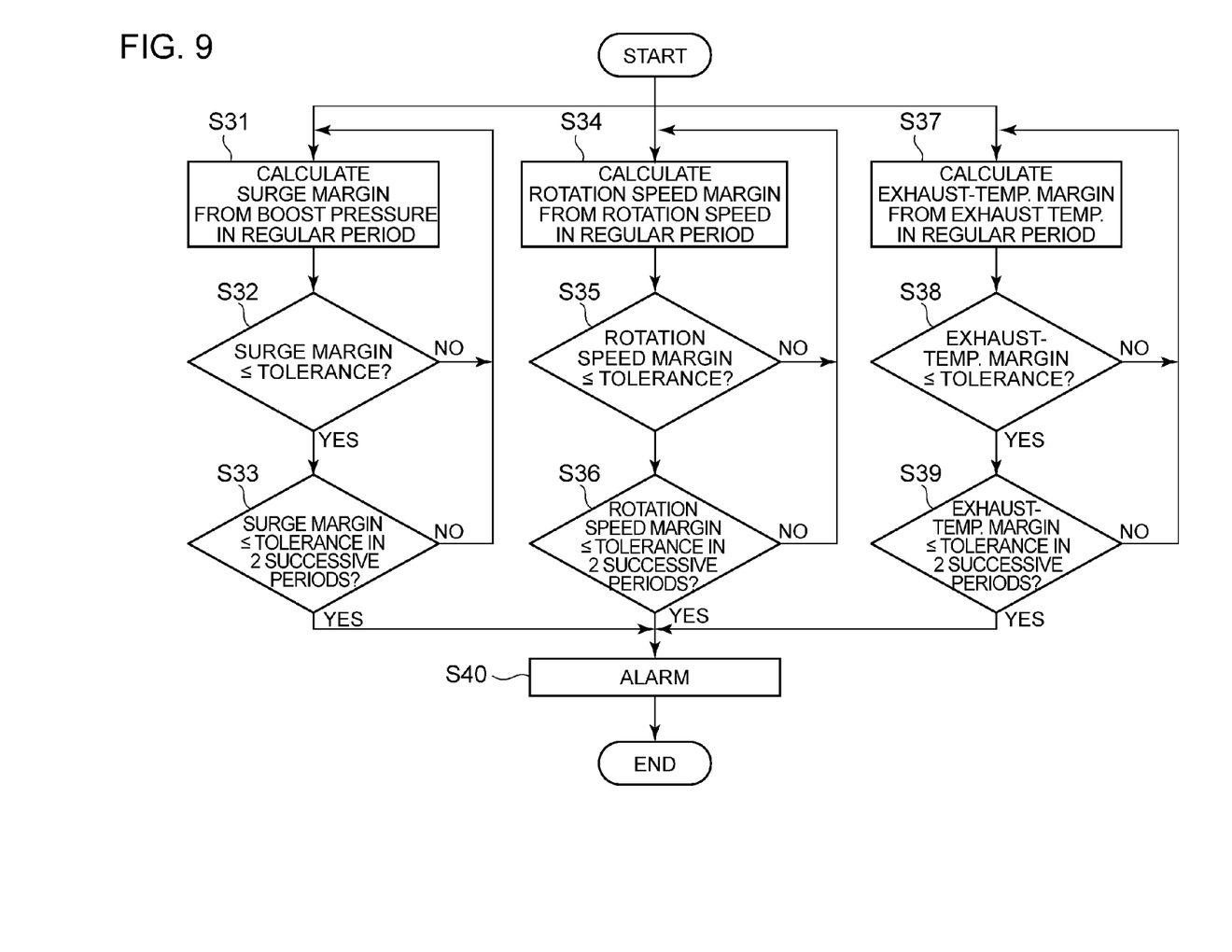
FIG. 9 is a flowchart of a process of lifetime estimation performed by a lifetime estimation unit according to the second embodiment.

Next, with reference to FIG. 9, the second embodiment of the lifetime estimation unit 49 of the turbo ECU 35 will now be described.

First, in step S31, the lifetime estimation unit 53 of the second embodiment calculates a surge margin on the basis of the average boost pressure or the maximum boost pressure in the period between the regular intervals. A turbocharger deteriorates in performance with the operating time, and an actual allowance (surge margin) of a supply-air pressure with respect to a surge pressure at which surging occurs determined on the basis of the performance characteristics of an unused compressor decreases as compared to that in an unused state.

Thus, the surge margin is calculated and the lifetime is determined using the value of the surge margin as an index. Specifically, the surge margin is calculated as a difference between the surge pressure and the actual boost pressure with respect to the actual boost pressure.

Next, in step S32, the calculated surge margin is compared to a preset reference surge margin, and it is determined whether the difference is not greater than a tolerance. If the difference is not greater than the tolerance, it is determined that deterioration has progressed. Then, in step S33, the same determination is performed again, and it is determined whether the surge margin is not greater than a reference surge margin in two successive periods of regular intervals. If the same determination is obtained successively, the process proceeds to step S40, and an alarm is outputted.

Further, similar determination is performed on a rotation-speed margin in steps S34 to S36. First, in step S34, the rotation-speed margin is calculated on the basis of the average rotation speed or the maximum rotation speed in the period between regular intervals.

Similarly to the above surge margin, the turbocharger deteriorates in performance with the operating time, and in particular, the characteristic performance of the waste-gate valve and the variable nozzle mechanism, in the case of a variable-displacement type turbocharger, may decrease, thus resulting in insufficient control on the amount of exhaust gas flowing into the turbine and over rotation. Thus, the rotation-speed margin, which is a margin of the actual rotation speed with respect to a tolerance over rotation, is calculated and the lifetime is determined using the value of the rotation margin as an index.

Specifically, the rotation-speed margin is calculated as a difference between the tolerance rotation speed and the actual rotation speed with respect to the actual rotation speed.

Next, in step S35, the calculated rotation-speed margin is compared to a preset reference surge margin, and it is determined whether the difference is not greater than a tolerance. If the difference is not greater than the tolerance, it is determined that deterioration has progressed. Then, in step S36, the same determination is performed again, and it is determined whether the rotation-speed margin is not greater than a reference rotation-speed margin in two successive periods at regular intervals. If the same determination is obtained successively, the process proceeds to step S40, and an alarm is outputted.

Further, similar determination is performed on an exhaust-temperature margin in steps S37 to S39. First, in step S37, an exhaust-temperature margin is calculated on the basis of the average exhaust temperature or the maximum exhaust temperature in the period between regular intervals.

Similarly to the above surge margin and the rotation-speed margin, the turbocharger deteriorates in performance with the operating time, and in particular, the characteristic performance of the waste-gate valve and the variable nozzle mechanism, in the case of a variable-displacement type turbocharger, may decrease, thereby resulting in insufficient control on the amount of exhaust gas flowing into the turbine to bring about over rotation, which may lead to an abnormal increase in the exhaust temperature. Thus, the exhaust-temperature margin, which is a margin of the actual exhaust temperature with respect to a tolerance exhaust temperature, is calculated and the lifetime is determined using the value of the exhaust-temperature margin as an index.

Specifically, the exhaust-temperature margin is calculated as a difference between the tolerance exhaust temperature and the actual exhaust-temperature with respect to the actual exhaust temperature.

Next, in step S38, the calculated exhaust-temperature margin is compared to a preset reference exhaust-temperature margin, and it is determined whether the difference is not greater than a tolerance. If the difference is not greater than the tolerance, it is determined that deterioration has progressed. Then, in step S39, the same determination is performed again, and it is determined whether the exhaust-temperature margin is not greater than a reference exhaust-temperature margin in two successive periods at regular intervals. If the same determination is obtained successively, the process proceeds to step S40, and an alarm is outputted.

As described above, if at least one of the surge margin, the rotation-speed margin, or the exhaust-temperature margin becomes not greater than a tolerance successively, it is determined that the turbocharger 23 has reached the end of its lifetime. Thus, it is possible to determine the deteriorated state and also the lifetime accurately. The above three margin determinations may be performed in combination, in case of which the accuracy of the lifetime determination can be improved even further.

As illustrated in FIG. 3, the lifetime estimation unit 53 includes a surge-margin calculation part (95), a lifetime determination part (96) which determines the lifetime by comparing the surge margin with a preset reference surge margin, a rotation-speed margin calculation part (97), a lifetime determination part (98) which determines the lifetime by comparing the rotation-speed margin with a preset reference rotation-speed margin, an exhaust-temperature margin calculation part (99) which calculates the exhaust-temperature margin, and a lifetime determination part (100) which determines the lifetime by comparing the exhaust-temperature margin with a preset reference exhaust-temperature margin.

Third Embodiment

Next, with reference to FIGS. 10 to 13, the third embodiment of the lifetime estimation unit 49 of the turbo ECU 35 will be described.

Figure 10:
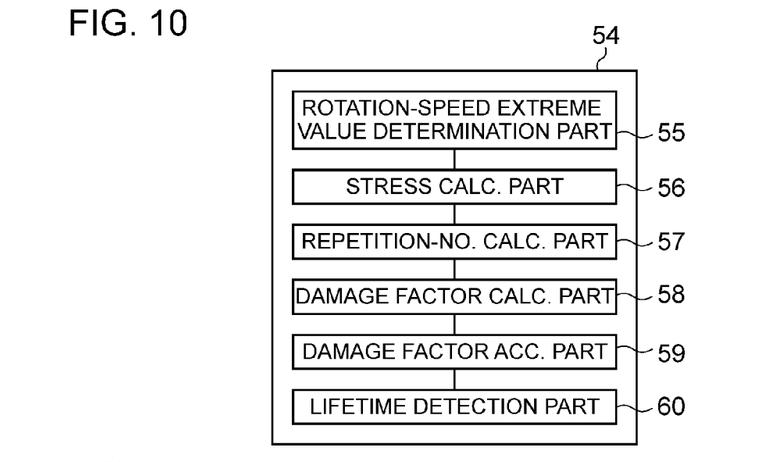
FIG. 10 is an explanatory diagram of an overall configuration of a lifetime estimation unit according to the third embodiment.

In the third embodiment, the determination of the lifetime estimation unit 54 is not based on the boost pressure, the rotation speed, the exhaust temperature, or the like in a period between regular intervals, unlike the first and second embodiments, but on information on occurrence number of an extreme value of the rotation-speed fluctuation of the turbocharger 23 and the corresponding rotation speed, the information being recorded throughout the entire operating period.

As illustrated in FIG. 10, the lifetime estimation unit 54 includes a rotation-speed extreme-value determination part 55 which determines the extreme value of the rotation speed, a stress calculation part 56 which calculates a stress amplitude from the rotation speed of the rotation-speed extreme value, a repetition-number calculation part 57 which calculates a repetition number on the basis of an S-N chart of fatigue strength of blades of an impeller of the compressor 23b or the turbine 23a from the stress amplitude, a damage-factor calculation part 58 which calculates a damage factor from the rotation speed of the rotation-speed extreme value, a damage-factor accumulation part 59 which calculates a damage-factor cumulative value which cumulates the damage factor as many times as the repetitive number, and a lifetime determination part 60 which determines the lifetime by comparing the damage-factor cumulative value calculated by the damage-factor accumulation part 59 with a preset damage-factor reference cumulative value.

Figure 11:
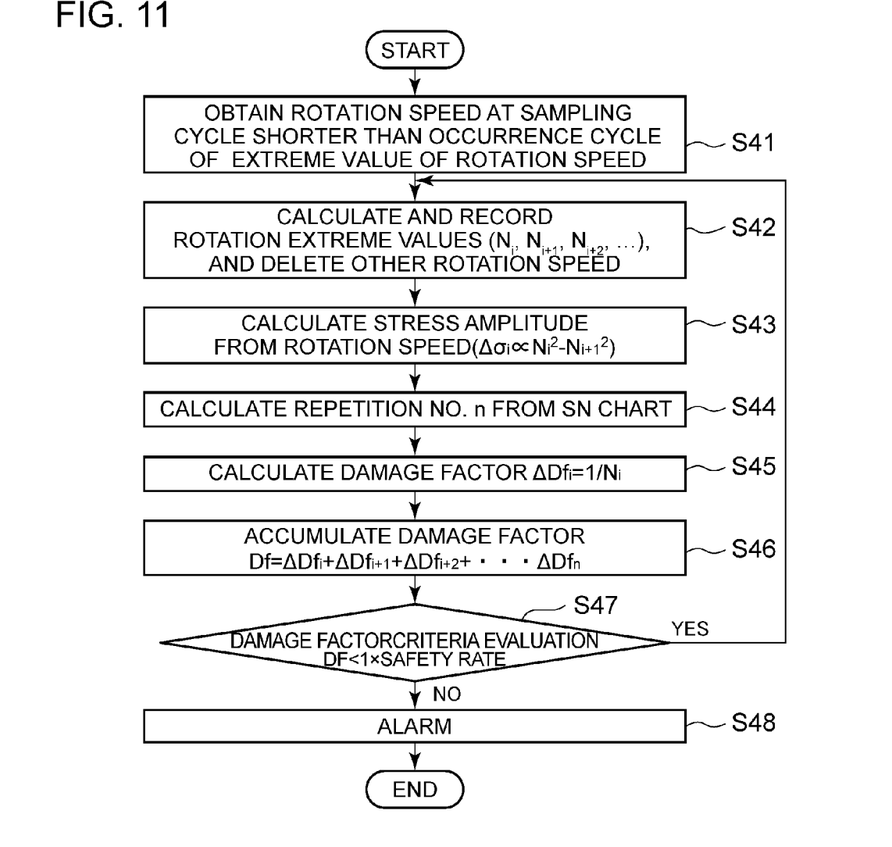
FIG. 11 is a flowchart of a process of lifetime estimation according to the third embodiment.
Figure 12:
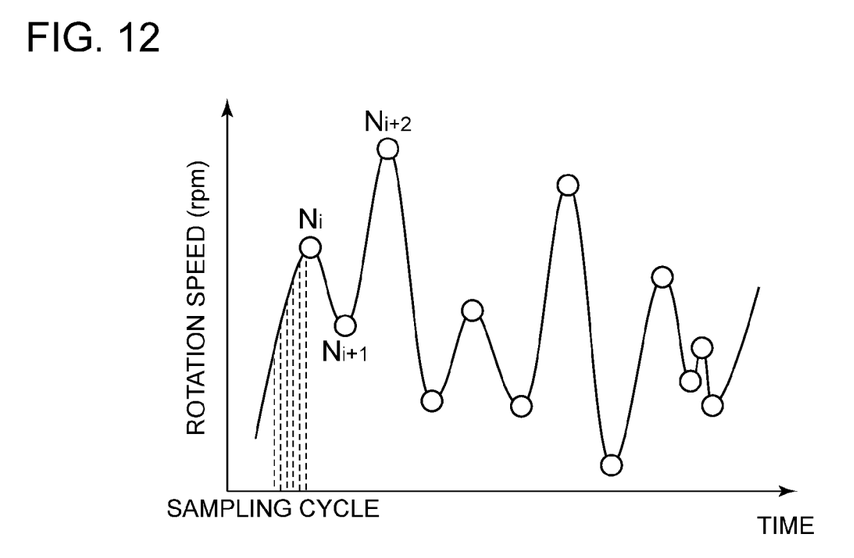
FIG. 12 is an explanatory diagram of steps S41, S42 of the flowchart in FIG. 11.

In the flowchart of FIG. 11, firstly in step S41, the rotation speed is obtained in a sampling cycle which is shorter than the occurrence cycle of the extreme value of the rotation speed of the turbocharger 23. In step S42, the rotation-speed extreme-value determination part 55 calculates and records the rotation-speed extreme values ($N_i$, $N_{i+1}$, $N_{i+2}$ . . . ). The other rotation numbers are deleted. The steps S41, 42 are illustrated in FIG. 12.

Next, in step S43, the stress amplitude is calculated from the rotation speed N. At this time, the stress amplitude $\Delta\sigma$ is calculated using a relationship of $\Delta\sigma \propto N_i^2 - N_{i+1}^2$. In a more complicated operation mode, the Rain-flow method may be used, for instance, to calculate the stress amplitude $\Delta\sigma$.

Figure 13:
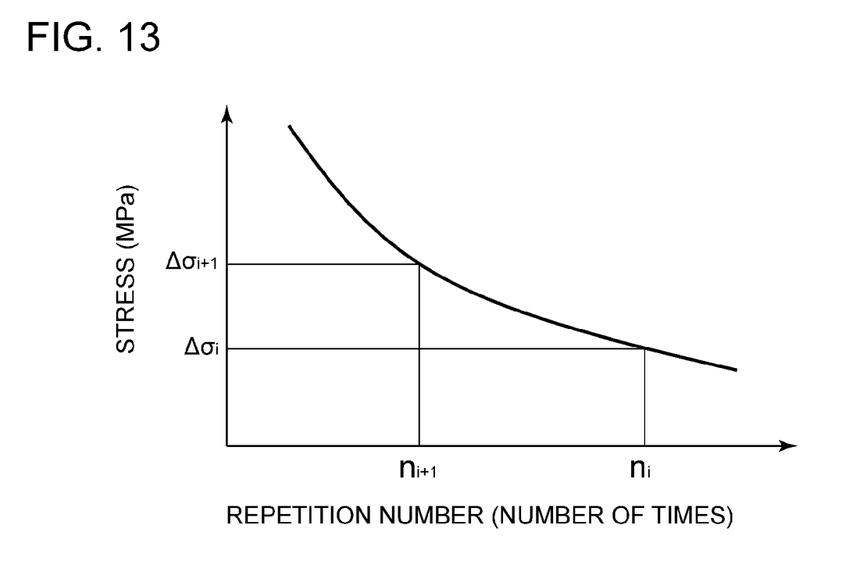
FIG. 13 is an explanatory diagram of steps S43, S44 of the flowchart in FIG. 11.

In step S44, a S-N chart on the fatigue strength is used to calculate the repetition number n from the S-N chart. The steps S43, 44 are illustrated in FIG. 13.

Further, the stress amplitude is calculated by the stress calculation part 56, and the repetition number is calculated by the repetition-number calculation part 57 on the basis of the S-N chart.

Next, the damage factor is calculated in step S45, and accumulated in step S46. The damage factor is defined by an expression of $\Delta Df_i = 1/N_i$, and the damage factor cumulative Df is calculated by an expression of $Df = \Delta Df_i + \Delta Df_{i+1} + \Delta Df_{i+2} + \ldots \Delta Df_n$.

Next, in step S47, the damage-factor cumulative value and the preset damage-factor reference cumulative value (1×safety rate) are compared to each other to determine the lifetime. Specifically, a comparison expression of Df<(1× safety rate) is used in determination. Further, the lifetime is determined on the basis of this relational expression.

In step S47, if the damage-factor cumulative value is less than a damage-factor reference cumulative value, the process returns to step S42 and repeats from calculation of the extreme value. If the damage factor-cumulative value is not less than the damage-factor reference cumulative value, the process proceeds to step S48 and an alarm is outputted.

As described above, in the third embodiment, the lifetime estimation unit 54 specifically includes the rotation-speed extreme value determination part 55, the stress-calculation part 56, the repetition-number calculation part 57, the damage-factor calculation part 58, the damage-factor accumulation part 59, and the lifetime determination part 60 to estimate a lifetime on the basis of a rotation speed which has rotation-speed extreme values in the rotation fluctuation and the occurrence number of the rotation extreme values. As a result, it is possible to determine the lifetime accurately on the basis of the fatigue strength of the blades of the impeller of the compressor 23b or the turbine 23a of the turbocharger 23.

In step S44, to calculate the repetition number n using the S-N chart related to the fatigue strength, two S-N charts may be provided, one for the blade material of the compressor 23b and another for the blade material of the turbine 23a, and the lifetime may be predicted using both of the two S-N charts, and the lifetime estimation may be performed on both of the compressor 23b and the turbine 23a. In this case, the lifetime is predicted for both of the compressor 23b and the turbine 23a, which makes it possible to improve the accuracy even further. Moreover, if the weaker one is known from the design in advance, only the weaker one may be monitored for the determination. In this case, accurate determination can be performed efficiently.

Fourth Embodiment

Next, with reference to FIG. 14, the fourth embodiment will be described. The fourth embodiment is different from the first embodiment in that the turbocharger 23 is a variable-displacement type turbocharger 61 instead of one having the waste-gate valve 31, and the other configuration is similar to that of the first embodiment. Thus, the same component is indicated by the same reference numeral and not described in detail.

Figure 14:
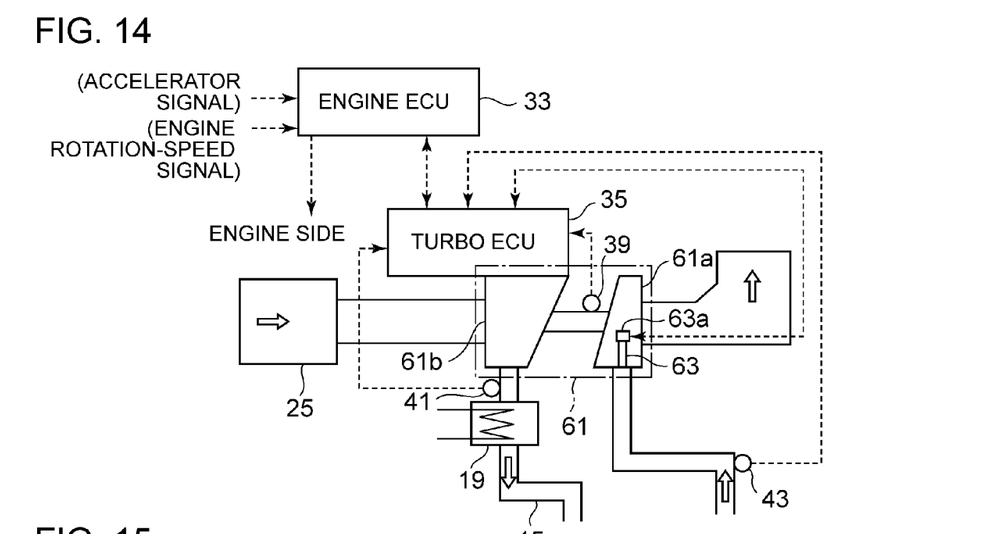
FIG. 14 is an overall configuration diagram showing application to a variable-displacement type turbocharger equipped with variable nozzle vanes, according to the fourth embodiment.

As illustrated in FIG. 14, the variable-displacement type turbocharger 61 is a turbocharger with a variable nozzle mechanism 63 arranged in the circumferential direction on the outer peripheral side of rotor blades, the variable nozzle mechanism 63 being configured to adjust the flow rate of exhaust gas to be introduced into a turbine 61a rotated by exhaust gas from the engine 3.

Thus, similarly to the first embodiment, signals from various sensors are inputted into the sensor signal input part of the turbo ECU 35. The control calculation part 44 of the turbo ECU 35 controls an actuator 63a for opening and closing guide vanes of the variable nozzle mechanism 63 so as to achieve the target boost pressure on the basis of the target-boost-pressure control signal from the engine ECU 33 and various sensor signals from the variable-displacement type turbocharger 61.

The variable nozzle mechanism 63 is disposed in the casing of the variable-displacement type turbocharger 61. Thus, in the present embodiment, it is not necessary to provide a bypass channel which is required in the first embodiment in which the waste-gate valve 31 is provided. As a result, it is possible to simplify the turbocharger device.

For the rest, regarding to the process of lifetime determination, the first to third embodiments are applied and the present embodiment has the same functional effects as the first embodiment.

Further, whereas the actuator 63a for opening and closing the variable nozzle mechanism 63 is controlled in the above description instead of controlling the actuator 31a of the waste-gate valve 31, it will be understood that the turbocharger device may include both of the waste-gate valve 31 and the variable-displacement type turbocharger 61 and perform both controls individually.

Fifth Embodiment

Next, with reference to FIG. 15, the fifth embodiment will be described. The fifth embodiment is different from the first embodiment in that the turbocharger is a two-stage turbocharger including the first (low-pressure stage) turbocharger 71 and the second (high-pressure stage) turbocharger 73, and the other configuration is similar to that of the first embodiment. Thus, the same component is indicated by the same reference numeral and not described in detail.

Figure 15:
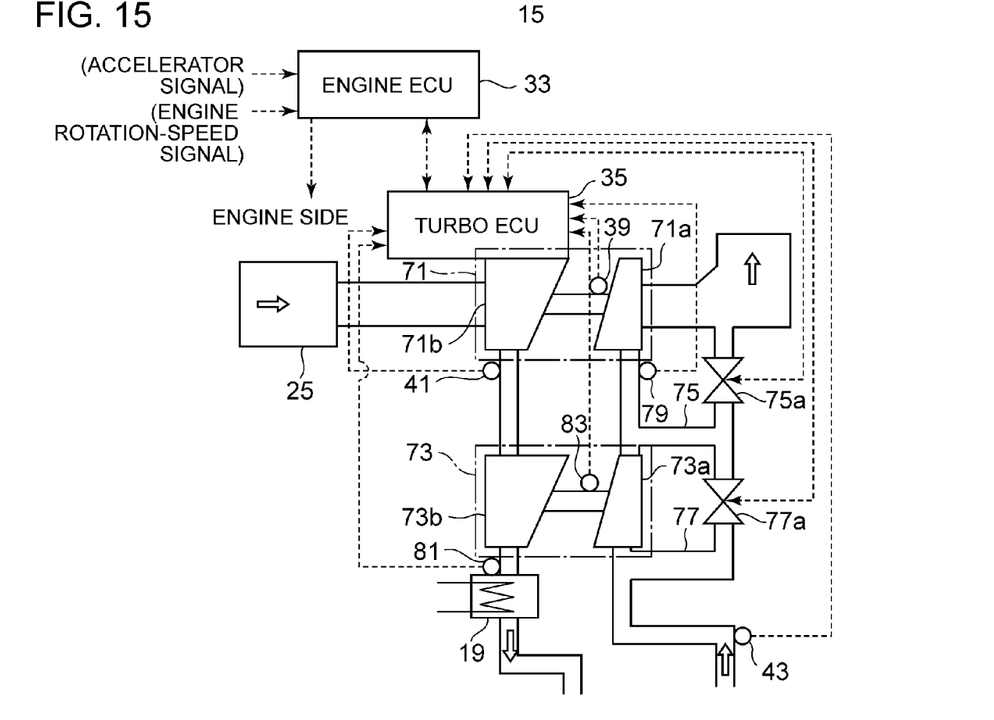
FIG. 15 is an overall configuration diagram showing application to a two-stage turbocharger, according to the fifth embodiment.

As illustrated in FIG. 15, the first (low-pressure stage) turbocharger 71 and the second (high-pressure stage) turbocharger 73 are disposed in this order in series from an intake upstream side.

At the intake side, air from an air cleaner 25 flows through the first compressor 71b to be introduced into the second compressor 73b at the downstream side of the first compressor 71b and an inter cooler 19 is disposed on the downstream side of the second compressor 73b. At the exhaust side, the second (high-pressure stage) turbine 73a is driven by exhaust-gas energy from the engine 3, and the exhaust gas flows downstream to drive the first (low-pressure stage) turbine 71a.

The first waste-gate valve 75a is disposed in the first bypass channel 75 bypassing the first turbine 71a, and the second waste-gate valve 77a is disposed in the second bypass channel 77 bypassing the second turbine 73a.

In the present embodiment, the first turbocharger 71 and the second turbocharger 73 are disposed in series in two stages, unlike the single stage turbocharger 23 in the first embodiment. Thus, it is possible to increase the boost pressure quickly and to improve the applicability of the present embodiment.

Signals of the pressure sensors 41, 81, the temperature sensors 43, 79, and the turbo rotation-speed sensors 39, 83, are inputted to the first turbocharger 71 and the second turbocharger 73 of the turbo ECU 35, respectively, and the lifetime determination is performed on the first turbocharger 71 and the second turbocharger 73. Regarding the process of lifetime determination, the first to third embodiments are applied and the present embodiment has the same functional effects as the first to third embodiments.

INDUSTRIAL APPLICABILITY

According to the present invention, it is possible to estimate a lifetime of a turbocharger accurately, and if the lifetime expires, the turbocharger can be replaced along with a turbo controller (turbo ECU) having recorded data of the operational history of the turbocharger, which makes it possible to facilitate acquisition of the operational history information of the turbocharger and reduce the initial costs of the turbocharger. Thus, the present invention can be suitably applied to a turbocharger of a vehicle, a ship, and a fixed engine.

DESCRIPTION OF REFERENCE NUMERAL

1 Turbocharger device
3 Engine
23 Turbocharger
23a Turbine
23b Compressor
31 Waste-gate valve
31a Actuator
33 Engine ECU (Engine controller)
35, 51 Turbo ECU (Turbo controller)
39, 83 Turbo rotation speed-sensor
41, 81 Pressure sensor
43, 79 Temperature sensor
44 Control calculation part
45 Sensor signal input part
47 Operational history recording part
49, 53, 54 Lifetime estimation unit
50 Cumulative-time calculation part
55 Rotation-speed extreme value determination part
56 Stress-calculation part
57 Repetition-number calculation part
58 Damage-factor calculation part
59 Damage-factor accumulation part
60, 90 Lifetime determination part
63 Variable nozzle mechanism
63a Actuator
71 First turbocharger
73 Second turbocharger

The invention claimed is:
1. A turbocharger device, comprising:
a turbocharger including a turbine rotated by exhaust gas from an engine and a compressor driven to rotate by the turbine to supercharge intake air to the engine; and
a turbo controller configured to control at least one of a waste-gate valve and a variable-displacement mechanism of an exhaust-gas amount supplied to the turbine to control a boost pressure of the turbocharger,
wherein the turbo controller includes a control calculation part and a sensor signal input part provided separately and independently from an engine controller for controlling operation of the engine and is mounted on a compressor housing at a side of the compressor of the turbocharger,
wherein the turbo controller further comprises an operational history recording part configured to record operational history information of the turbocharger, and a lifetime estimation unit configured to estimate a lifetime of the turbocharger based on the operational history information including at least one of a rotation speed of a rotation shaft of the turbocharger, a boost pressure of the compressor, and a temperature of exhaust gas flowing into the turbine, inputted from the sensor signal input part and recorded by the operational history recording part.
2. The turbocharger according to claim 1,
wherein the lifetime estimation unit comprises:
a cumulative-time calculation part configured to calculate a cumulative time of each rotation speed based on an average rotation speed or a maximum rotation speed of the rotation shaft of the turbocharger in a periodic interval, and a lifetime determination part configured to determine the lifetime by comparing the cumulative time with a preset reference cumulative time.
3. The turbocharger device according to claim 1,
wherein the lifetime estimation unit comprises:
a surge-margin calculation part configured to calculate a surge margin based on the boost pressure of the compressor, the surge margin representing a margin of the boost pressure with respect to occurrence of surging of the compressor; and
a lifetime determination part configured to determine the lifetime by comparing the surge margin with a preset reference surge margin.
4. The turbocharger device according to claim 1,
wherein the lifetime estimation unit comprises:
a rotation-speed margin calculation part configured to calculate a rotation-speed margin based on the rotation speed of the rotation shaft of the turbocharger, the rotation-speed margin representing a margin with respect to a tolerance rotation speed at which over rotation occurs; and
a lifetime determination part configured to determine the lifetime by comparing the rotation-speed margin with a preset reference rotation-speed margin.
5. The turbocharger device according to claim 1,
wherein the lifetime estimation unit comprises:
an exhaust-temperature margin calculation part configured to calculate an exhaust-temperature margin based on the temperature of the exhaust gas flowing into the turbine, the exhaust-temperature margin representing a margin with respect to a tolerance exhaust temperature at which over heating occurs; and
a lifetime determination part configured to determine the lifetime by comparing the exhaust-temperature margin with a preset reference exhaust-temperature margin.

6. The turbocharger according to claim 1,
wherein the lifetime estimation unit comprises a lifetime determination part configured to determine the lifetime based on a rotation speed which has a rotation-speed extreme value in a rotation-speed fluctuation of the turbocharger and an occurrence number of the rotation-speed extreme value.

7. The turbocharger according to claim 6,
wherein the lifetime estimation unit comprises
a rotation-speed extreme-value determination part configured to determine the rotation-speed extreme value,
a stress calculation part configured to calculate a stress amplitude from the rotation speed of the rotation-speed extreme value,
a repetition-number calculation part configured to calculate a repetition number based on an S-N chart of fatigue strength of blades of an impeller of the compressor or the turbine from the stress amplitude, a damage-factor calculation part configured to calculate a damage factor from the rotation speed of the rotation-speed extreme value, and a damage-factor accumulation part configured to accumulate the damage factor as many time as the repetition number to calculate a damage-factor cumulative value, and
wherein the lifetime determination part is configured to determine the lifetime by comparing the damage-factor cumulative value calculated by the damage-factor accumulation part with a preset damage-factor reference cumulative value.

* * * * *